UNITED STATES PATENT OFFICE.

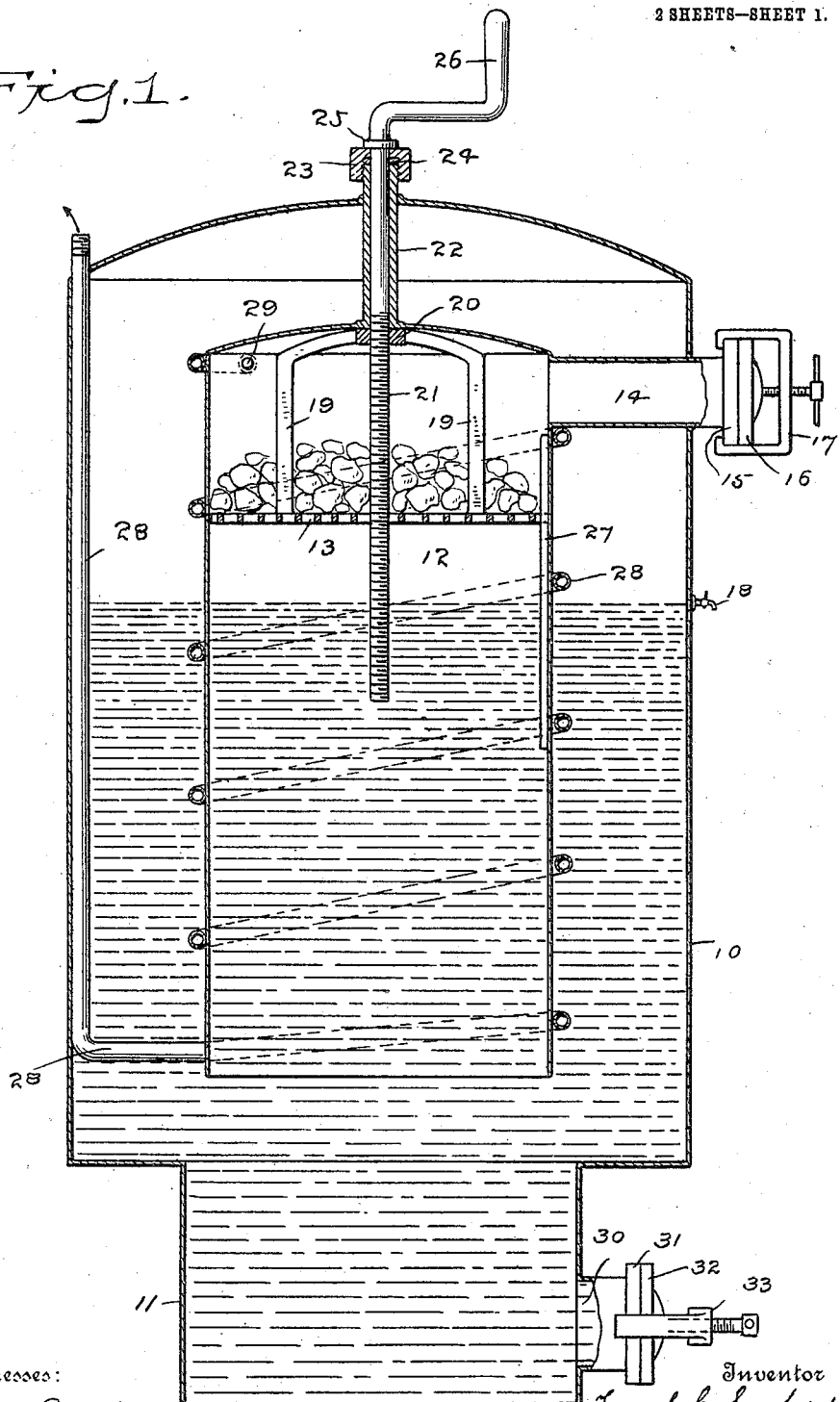

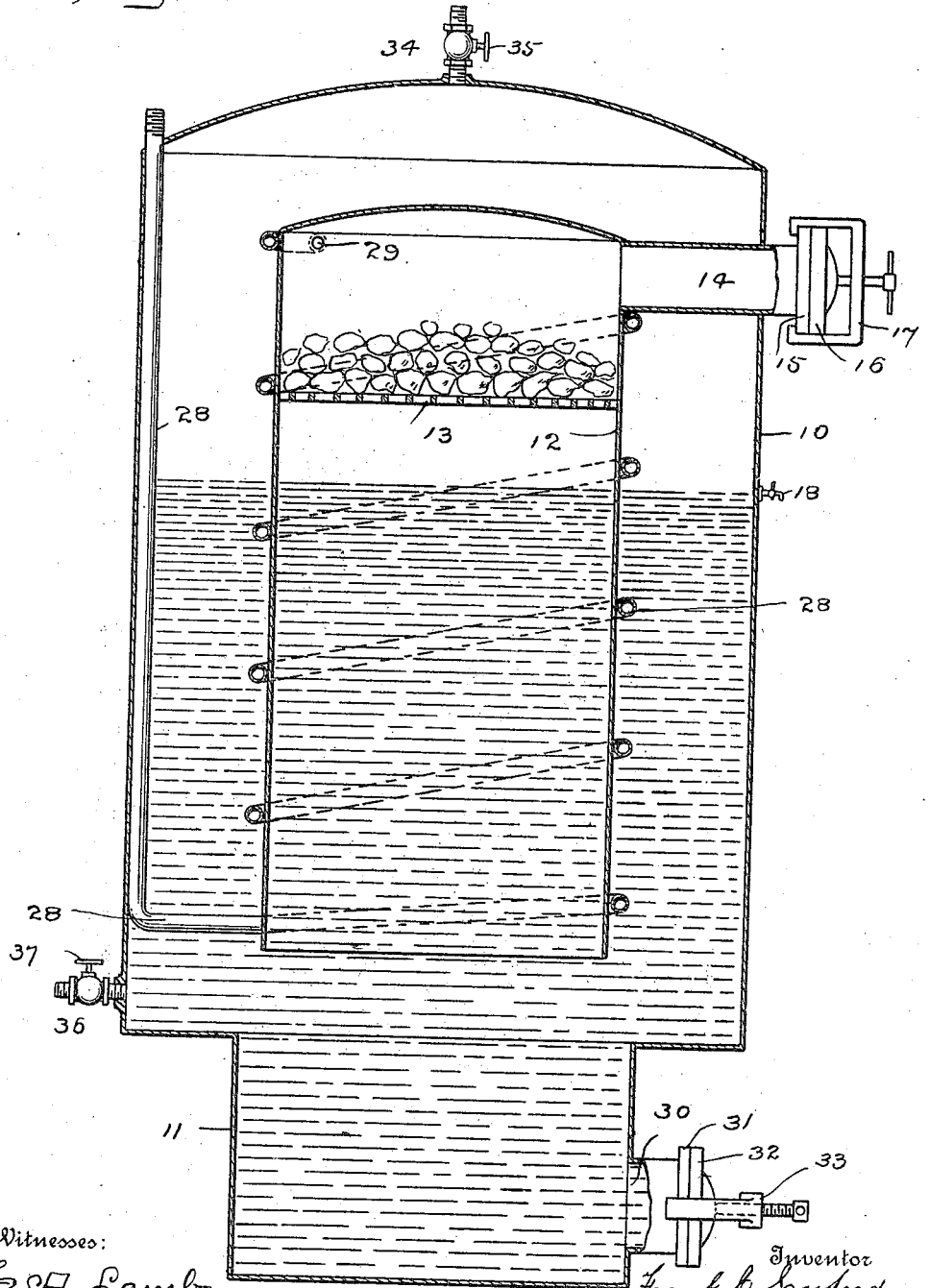

FRANK C. SANFORD, OF BRIDGEPORT, CONNECTICUT.

ACETYLENE-GENERATOR.

965,949.  Specification of Letters Patent. Patented Aug. 2, 1910.

Application filed October 22, 1908. Serial No. 459,036.

*To all whom it may concern:*

Be it known that I, FRANK C. SANFORD, a citizen of the United States, residing at Bridgeport, county of Fairfield, State of Connecticut, have invented a new and useful Acetylene-Generator, of which the following is a specification.

This invention has for its object to provide a simple and inexpensive acetylene generator in which the water shall be utilized to cool the gas and which, after the calcium carbid and water shall have been placed in contact, shall be automatic in its action, means being provided for lowering the carbid to the water or raising the water to the carbid, and vice versa, in starting or stopping the generation of acetylene gas.

With these and other objects in view I have devised the novel acetylene generator of which the following description in connection with the accompanying drawings is a specification, reference characters being used to indicate the several parts.

Figures 1 and 2 are vertical sections of my novel generator, illustrating variant modes of placing the carbid and water in contact.

10 denotes the main or outer reservoir for water, preferably cylindrical in form, the lower portion of which, indicated specifically by 11, is of reduced diameter for a purpose presently to be explained, and 12 denotes an inner reservoir which is open at the bottom and is partly submerged in the water.

The carbid is carried by a rack or grid 13 in the inner reservoir, a passage 14 extending from the upper portion of the inner reservoir through the wall of the outer reservoir being provided for supplying the carbid. I have shown the outer end of passage 14 as provided with a flange 15 and the passage as closed by a cap 16 which is secured to the flange by a suitable clamp indicated by 17. The reservoir is provided with a pet-cock, indicated by 18, in order to enable the operator to preserve a uniform water level.

In the form illustrated in Fig. 1, the grid is made vertically movable in the inner reservoir in order to enable the operator to lower the carbid to the water. The grid is suspended from a frame 19 having at its upper end a nut 20 which is engaged by a screw 21 shown as inclosed in a tube 22 which is rigidly secured to both the inner and outer reservoirs and extends upward through the top of the outer reservoir, the top of the tube being closed by a screw cap 23 through which the rod passes, packing, indicated by 24, being placed within the cap to prevent the escape of gas. The upper end of the screw is provided with a collar 25 which rests upon the cap and with a hand piece 26 for convenience in operation. 27 denotes a vertical guide strip at one side of the inner reservoir which is engaged by the grid to prevent rotation of the grid when the screw is rotated to raise or lower the grid. 28 denotes a gas pipe which leads from the upper portion of the inner reservoir as at 29. This pipe is coiled downward about the inner reservoir to the bottom thereof, the major portion of the coils being immersed in the water, and then extends upward through the water and outward through the outer reservoir to the place of use, the special use to which the gas is applied being wholly immaterial so far as the present invention is concerned. By passing the gas from the inner reservoir through the coils and the vertical portion of the pipe, the gas is thoroughly cooled by the contact of the water in the reservoir with the pipes.

In use, the reservoirs are filled with water to the required level and the grid is raised and supplied with carbid through passage 14, which is then closed. In starting, the screw is rotated to lower the grid with the carbid thereon into the water. Gas is at once formed, which fills the upper portion of the inner reservoir and passes out through pipe 28. The operation of the generator in use is wholly automatic. So long as all the gas formed is used, the water level in both reservoirs will not vary to any great extent. As soon, however, as an excess of gas is formed over the amount required, pressure of gas in the inner reservoir will force the water in the inner reservoir downward raising it of course correspondingly in the outer reservoir against the air in the upper portion thereof which is air tight and capable of standing all the pressure that can be generated within the apparatus, so that the air in said upper part of the outer reservoir forms a cushion. As the water is forced downward in the inner reservoir withdrawing the water from the carbid, the formation of gas will lessen and will cease entirely as soon as the water is forced away from the carbid. As soon as the surplus pressure in the inner reservoir is overcome by the use of gas, the air cushion which has been formed in the outer reservoir will act automatically to raise the water in the inner reservoir and as soon as the water reaches the carbid the generation of gas will again commence and the water in the inner reservoir will be again forced downward away from the carbid. Just as soon, however, as gas is generated in excess of the amount required for use, the pressure of gas in the inner reservoir will again force the water in the inner reservoir downward away from the carbid and will either lessen or wholly stop the generation of gas, this automatic rise and fall of the water in the inner reservoir continuing so long as gas is being used and insuring a practically uniform gas pressure in the pipe. When gas is no longer required, the grid is raised by means of the screw away from the water and the generation of gas ceases. A carbid is decomposed by the water, the residuum drops downward through the grid, the live carbid on the grid dropping downward and taking the place of the decomposed carbid on the grid as the residuum passes through. The residuum drops downward through the water in the inner reservoir and into the water in the lower portion 11 of the outer reservoir, from which it may be removed through a passage 30 leading from the lower portion of the outer reservoir and shown in the present instance as provided with a flange 31. The passage is closed by a cap 32 which is retained in place by a clamp 33.

In the form illustrated in Fig. 2, instead of lowering the carbid to the water to cause the generation of gas, I raise the water in the inner reservoir to the carbid, the automatic operation of the generator being the same as before. In this form, the screw and frame are dispensed with and the grid is rigidly secured in any suitable manner in the inner reservoir. The raising of the water in the inner reservoir may be produced either by air pressure or by water pressure, means for producing both air pressure and water pressure being shown in Fig. 2. 34 denotes a connection at the top of the outer reservoir for the attachment of an air pipe, the connection being provided with a suitable valve operated by a hand wheel indicated by 35. To start the generation of gas, the valve in the connection is opened and air is forced in, the effect of which is to force the water in the outer reservoir downward and to raise the water in the inner reservoir, the pressure being continued until the water in the inner reservoir is in contact with the carbid. The air pressure is then shut off and the operation of the generation of the required amount of gas proceeds automatically as before.

If preferred or if the application of water pressure is more convenient, a water pipe may be attached to a connection 36 at the lower end of the main portion of the outer reservoir. This connection is provided with a suitable valve operated by a hand wheel 37. To cause the generation of gas through the application of water pressure, the valve in connection 36 is opened and water pressure is applied through said connection, the effect of which is to raise the water in both reservoirs. The air in the upper portion of the outer reservoir forms an air cushion and insures the raising of the water in the inner reservoir in which the pressure is relieved by the use of gas, the generation of which commences as before as soon as the water in the inner reservoir comes in contact with the carbid on the stationary grid, the operation of the generator as soon as the generation of gas commences being automatic as before.

Having thus described my invention, I claim:

1. An acetylene generator comprising an outer reservoir for water, an inner reservoir open at its bottom and arranged to be partially submerged, a tube rigidly connecting said reservoir, a grid located within said inner reservoir, an operating rod for said grid mounted in said tube, a laterally extended supply pipe leading from said inner reservoir through the outer reservoir, a closure for the same, and a gas pipe leading from said inner reservoir.

2. An acetylene generator comprising an outer receptacle, an inner cylindrical receptacle having its lower end open, a tube concentrically and integrally formed in the top of said inner receptacle, and extending through and rigidly connected to the outer receptacle, a lateral supply pipe integrally formed near the top of said inner receptacle and extending through said outer receptacle, a gas pipe leading from said receptacle, a carbid-grid vertically movable in said inner receptacle, and having an internally threaded collar, and a threaded operating rod coacting with said collar to elevate or lower said grid.

3. An acetylene generator comprising an outer receptacle, an inner cylindrical receptacle having its lower end open, a tube concentrically and integrally formed in the top of said inner receptacle, and extending through and rigidly connected to the outer receptacle, a lateral supply pipe integrally formed near the top of said inner receptacle and extending through said outer receptacle, a gas pipe leading from said receptacle, a carbid-grid vertically movable in said inner receptacle, and having an internally threaded collar, a threaded operating rod coacting with said collar to elevate or lower said grid, and a feather vertically arranged upon the inner surface of said inner receptacle to prevent rotation of said grid.

In testimony whereof I affix my signature, in presence of two witnesses.

FRANK C. SANFORD.

Witnesses:
A. M. WOOSTER,
S. W. ATHERTON.